(12) United States Patent
Yao

(10) Patent No.: US 11,659,252 B2
(45) Date of Patent: *May 23, 2023

(54) USER DEVICE CONTROL OF TRANSMISSION PARAMETERS

(71) Applicant: DISH Network L.L.C., Englewood, CO (US)

(72) Inventor: Kevin Yao, Cheyenne, WY (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/945,908

(22) Filed: Sep. 15, 2022

(65) Prior Publication Data

US 2023/0020221 A1    Jan. 19, 2023

Related U.S. Application Data

(63) Continuation of application No. 16/014,038, filed on Jun. 21, 2018, now Pat. No. 11,463,782.

(51) Int. Cl.
| | |
|---|---|
| *H04N 21/6377* | (2011.01) |
| *H04N 21/6379* | (2011.01) |
| *H04N 21/2343* | (2011.01) |
| *H04N 21/6373* | (2011.01) |

(52) U.S. Cl.
CPC ..... *H04N 21/6377* (2013.01); *H04N 21/2343* (2013.01); *H04N 21/6373* (2013.01); *H04N 21/6379* (2013.01)

(58) Field of Classification Search
CPC .......... H04N 21/2343; H04N 21/6373; H04N 21/6377; H04N 21/6379
See application file for complete search history.

(56) References Cited

U.S. PATENT DOCUMENTS

| | | |
|---|---|---|
| 7,818,444 B2 | 10/2010 | Brueck |
| 8,868,772 B2 | 10/2014 | Major et al. |
| 9,432,479 B2 | 8/2016 | Jemiolo et al. |
| 9,544,623 B2 | 1/2017 | Chen |
| 9,860,290 B2 | 1/2018 | Oyman |
| 2002/0194361 A1 | 12/2002 | Itoh et al. |
| 2003/0236906 A1 | 12/2003 | Klemets et al. |
| 2011/0241637 A1 | 10/2011 | Parker |
| 2012/0278496 A1 | 11/2012 | Hsu |
| 2013/0275615 A1 | 10/2013 | Oyman |
| 2014/0020036 A1 | 1/2014 | Hasek et al. |
| 2014/0040496 A1 | 2/2014 | Moorthy et al. |
| 2014/0052846 A1 | 2/2014 | Scherkus et al. |
| 2015/0304390 A1 | 10/2015 | Chakarapani |
| 2017/0063692 A1 | 3/2017 | Roncero Izquierdo et al. |
| 2017/0078921 A1 | 3/2017 | Xia et al. |
| 2019/0394534 A1 | 12/2019 | Yao |

*Primary Examiner* — Nicholas T Corbo
(74) *Attorney, Agent, or Firm* — Perkins Coie LLP

(57) ABSTRACT

A method of controlling, from a user device, a manner in which program content is received from a content server. The method includes: transmitting, from the user device, at least one transmission-quality-of-service (TXQ) parameter to the content server, wherein the at least one TXQ parameter updates a default TXQ parameter at the content server; and in response to transmitting the at least one TXQ parameter, receiving new program content in accordance with the at least one TXQ parameter.

20 Claims, 4 Drawing Sheets

USER DEVICE CONTROL OF TRANSMISSION PARAMETERS

CROSS-REFERENCE TO RELATED APPLICATIONS

This application is a continuation of U.S. patent application Ser. No. 16/014,038 filed Jun. 21, 2018, the disclosure of which is incorporated herein by reference in its entirety.

BACKGROUND

When transmitting television programming to subscriber devices, a backend computer determines a number of settings unique to potentially millions of such devices. Each time a new subscriber device comes online, the backend computer must determine appropriate settings for the respective subscriber device. Then, once the unique settings are determined, the backend computer encodes the programming in accordance with the settings. This places a significant computational burden on the backend computer, resulting in programming control inefficiencies.

DETAILED DESCRIPTION

Figure 1:
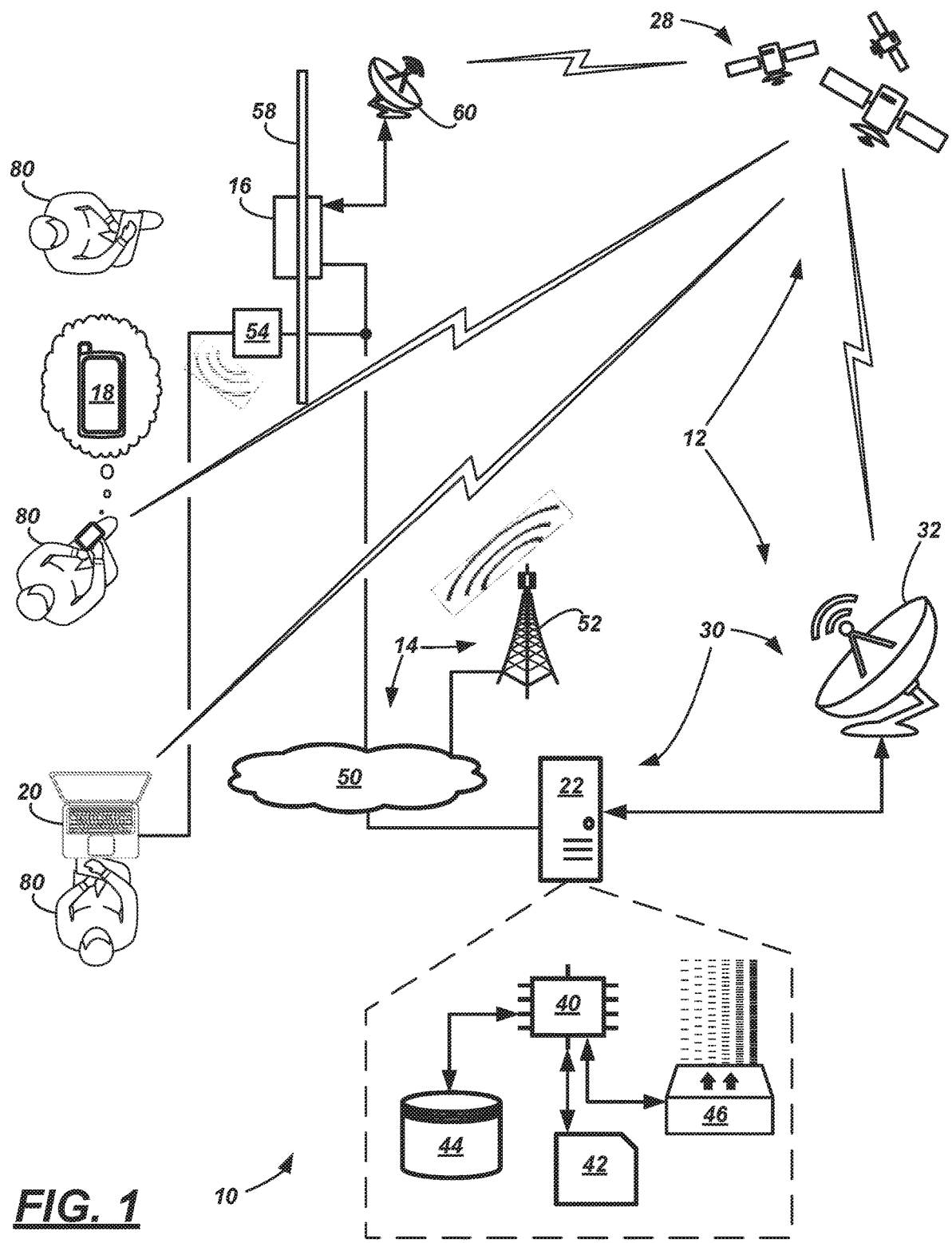
FIG. 1 is a schematic diagram of an illustrative media delivery system.

Methods are described of controlling, from a user device, a manner in which program content is received from a content server. According to at least one non-limiting example, a method comprises: receiving, at a user device, program content; using the program content, determining at least one transmission-quality-of-service (TXQ) parameter; transmitting the at least one TXQ parameter to a content server; and in response to transmitting the at least one TXQ parameter, receiving new program content in accordance with the at least one TXQ parameter.

According to at least one example of the method, the user device comprises one of a set top box, a Smart phone, a laptop computer having two-way communication capability, a personal digital assistant, a netbook computer, or a tablet computer.

According to at least one example of the method, the program content comprises electronically-broadcasted audio data, electronically-broadcasted visual data, electronically-broadcasted meta-data, or a combination thereof.

According to at least one example of the method, the at least one TXQ parameter is a codec profile or a level parameter.

According to at least one example of the method, the codec profile defines a compression algorithm used to compress audio data, video data, meta-data, or combination thereof.

According to at least one example of the method, the level parameter comprises at least one of a bitrate value, a frame rate value, a frame size value, a profile value, a format type, a format level, or a segment duration value.

According to at least one example of the method, determining the at least one TXQ parameter further comprises first monitoring a threshold (T) of the program content.

According to at least one example of the method, determining the at least one TXQ parameter further comprises determining a mathematical mode of a set of monitored TXQ parameters.

According to at least one example of the method, transmitting the at least one TXQ parameter further comprises instructing the content server to update one of its default TXQ parameters, with respect to the user device.

According to at least one example, the method further comprises: transmitting, to the content server, a request to adjust a bitrate value while receiving the new program content; and receiving the new program content, from the content server, at the requested bitrate value.

According to at least one additional example, a method is described that comprises: transmitting, from a user device, at least one transmission-quality-of-service (TXQ) parameter to a content server, wherein the at least one TXQ parameter updates a default TXQ parameter at the content server; and in response to transmitting the at least one TXQ parameter, receiving new program content in accordance with the at least one TXQ parameter.

According to at least one example of the method, the new program content comprises electronically-broadcasted audio data, electronically-broadcasted visual data, electronically-broadcasted meta-data, or a combination thereof.

According to at least one example of the method, the at least one TXQ parameter is a codec profile or a level parameter.

According to at least one example of the method, the codec profile defines a compression algorithm used to compress audio data, video data, meta-data, or combination thereof.

According to at least one example of the method, the level parameter comprises at least one of a bitrate value, a frame rate value, a frame size value, a profile value, a format type, a format level, or a segment duration value.

According to at least one example, the method further comprises: prior to transmitting the at least one TXQ parameter, determining, at the user device, the at least one TXQ parameter by first monitoring a threshold (T) of previously-received program content.

According to at least one example, the method further comprises: prior to transmitting the at least one TXQ parameter, determining, at the user device, a mathematical mode of a set of monitored TXQ parameters.

According to at least one example of the method, transmitting the at least one TXQ parameter further comprises instructing the content server to update one of its default TXQ parameters, with respect to the user device.

According to at least one example, the method further comprises: transmitting, to the content server, a request to adjust a bitrate value while receiving the new program content; and receiving the new program content, from the content server, at the requested bitrate value.

According to at least one other example, a computer program product, comprising a non-transitory computer-readable medium storing instructions executable by a mobile device, the instructions comprising, to: receive, at a user device, program content; using the program content, determine at least one transmission-quality-of-service (TXQ) parameter; transmit the at least one TXQ parameter to a content server; and in response to transmitting the at least one TXQ parameter, receive new program content in accordance with the at least one TXQ parameter.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Turning now to FIG. 1, a media delivery system 10 is shown that includes a satellite communication system 12, a wired and/or wireless communication system 14, and a plurality of user devices 16, 18, 20 (e.g., a set top box 16, a Smart phone 18, and a laptop computer 20 are illustrated by way of example only—i.e., not intending to be limiting). It should be appreciated that examples exist with more or fewer user devices; e.g., typically, thousands or millions of user devices are utilized, being spread across a wide geographic region. By way of example in the present disclosure, user devices 16-20 receive audio and/or visual content programs via satellite communication system 12, via wired and/or wireless communication system 14, via a combination thereof, or the like. As described more below, each respective user device 16-20 may execute a process to control the manner in which program content is delivered, respectively, to them.

The satellite communication system 12 may comprise at least one content server 22 which delivers program content to the devices 16-20. Conventionally, for each program content, the content server 22 iteratively executes a predictive algorithm to determine one or more transmission-quality-of-service (TXQ) parameters, and then, server 22 uses these TXQ parameters to transmit the respective content program to a respective user device (e.g., such as one of devices 16-20). Executing this predictive algorithm for thousands, millions, etc. of user devices places a significant computational burden on the content server 22.

As used herein, a transmission-quality-of-service (TXQ) parameter is at least one codec profile, at least one level parameter, or a combination thereof. As used herein, a codec profile defines a compression algorithm used to compress audio data, video data, meta-data, or a combination thereof (at the server 22). It will be appreciated that compression techniques are desirable as they minimize bandwidth usage thereby permitting more throughput per channel; non-limiting examples of codec profiles include Advanced Video Coding (AVC/H.264) and High Efficiency Video Coding (HEVC/H.265), just to name a couple. The codec profile may comprise other data as well (e.g., including, but not limited to, subtitle data, format data (e.g., MP3), etc.). As used herein, a level parameter is a measure of transmission data (e.g., nature of transmission, decoding ability, decoding efficiency, or the like), relevant to a decoder (of a particular user device) and relevant to a type of program content. Non-limiting examples of level parameters include a maximum bitrate value, a frame rate value, a frame size value, a profile value, a format type, a format level, and/or a segment duration value. A type of program content refers to the nature of the content—e.g., fast-action video (e.g., common in action movies, sporting events, etc.), slow-action video (e.g., common in news programming, talk shows, etc.), and medium-action video (e.g., video action therebetween). Thus, for example, to minimize video smearing for a particular program content (comprising fast-action video) content server 22 may determine new TXQ parameter(s)—e.g., decreasing the frame size value and/or increasing a maximum bitrate value, just to name a couple examples.

In the present disclosure, at least some of the respective user devices 16-20 determine at least one transmission-quality-of-service (TXQ) parameter. As will be shown by one of the examples below, each of user devices 16-20 may determine and request that content server 22 use the at least one TXQ parameter (e.g., a maximum bitrate value) when transmitting program content to the respective user device. Accordingly, content server 22 may deliver program content using the requested parameter. By permitting a plurality of user devices (e.g., 16-20) to determine their respective TXQ parameters, computational burden at the content server 22 is reduced, and an overall efficiency of the media delivery system 10 is improved.

As set forth above and shown in FIG. 1, media delivery system 10 may comprise any suitable electronics which facilitate delivery of content programs over a wide geographic region. As used herein, a program content is electronically-broadcasted audio and/or visual data from content server 22 (e.g., a segment of entertainment and/or infotainment data). In many examples, the content program will comprise both an audio component and a video component; however, this is not required. Each program content may be live or pre-recorded. Each may have a predetermined duration (e.g., such as radio or television series, movies, news, documentaries, etc.), or each program content may have an estimated or otherwise indeterminate length (e.g., such as a sporting event, news, etc.). As explained more below, program content may be delivered, from the content server 22 to the user devices 16-20, via satellite system 12, via the wired and/or wireless communication system 14, via a combination thereof, or the like.

Satellite communication system 12 may comprise a constellation of satellites 28, and a satellite gateway 30 that includes a transceiver 32 and content server 22—content server 22 storing and managing delivery of program contents to the plurality of user devices 16-20 using, among other things, the satellites 28 and transceiver 32. Satellites 28 may comprise any suitable quantity of orbiting devices. In at least one example, each satellite 28 thereof may be identical; therefore, only one will be described. Satellite 28 may be any suitable satellite communication equipment located in earth's orbit—non-limiting examples include: communications satellites, observation satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans.

According to one example, satellite 28 may be a so-called bent-pipe satellite. For example, satellite 28 may receive a wireless uplink communication from gateway 30, amplify the communication, perform a frequency shift (to convert the uplink communication to a downlink communication), amplify the downlink communication, and transmit the downlink communication to one or more of the user devices 16-20. This is merely one example; systems other than bent-pipe systems can be used instead. Further, satellite technology is generally known; accordingly, other aspects of satellites 28 will not be described herein.

The transceiver 32 and content server 22 of gateway 30 also are generally known in the art and will not be described in detail below. For example, transceiver 32 may comprise any suitable satellite antenna device capable of providing broadband services. In at least one example, transceiver 32 both sends and receives wireless satellite communications; however, this is not required. Still other examples exist.

Content server 22 comprises one or more networked computers servers configured to provide program content to user devices such as devices 16-20. In FIG. 1, one content server 22 is shown by way of example and for purposes of illustration (not intending to be limiting). Content servers 22 may comprise, among other things, one or more processors 40, computer memory 42, one or more databases 44, and one or more encoders 46. According to one example, processor(s) 40 may comprise one or more electronic devices capable of processing instructions (e.g., also referred to as programming code)—non-limiting examples of processor(s) 40 include: a microprocessor, a microcontroller or controller, an application specific integrated circuit (ASIC), a field-programmable logic array (FPGA), etc.— just to name a few. Processor(s) 40 may be dedicated to server 22, or it may be shared with other systems and/or networked computers. As will be apparent from the description which follows, server 22 may be programmed to carry out at least a portion of the method described herein. For example, processor(s) 40 can be configured to execute digitally-stored instructions which may be stored in memory 42 which include: determining at least one codec profile and at least one level parameter for a particular user device; encoding program content according to the determined codec profile; delivering program content to a respective user device, according to the at least one level parameter; using adaptive bitrate streaming to change level parameter(s), based on network conditions, congestion or demand, etc.; receiving a request, from each of a plurality of user devices, to deliver respective program content according to TXQ parameter(s), wherein the parameters are communicated to the server 22 from the respective user devices; and transmitting, with respect to each user device, respective program content thereto according to the requested TXQ parameters. These instructions are merely examples which may be executed in total or according to any suitable combination or sequence; other instruction examples also exist.

Memory 42 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 42 may store one or more computer program products which may be embodied as software, firmware, or the like.

In at least one example, content server 22 includes one or more databases 44 to store, among other things, collections of pre-recorded program contents in a filing system. Non-limiting examples of program contents include movies, television series (e.g., organized by episode, season, series, etc.), documentaries, television specials, previously-recorded sporting events, advertisements, etc. Accordingly, server 22 may use processor(s) 40 to: retrieve, from databases 44, multiple program contents; and control operation of the transceiver 32 in order to provide different program contents (e.g., concurrently) to the user devices 16-20 via the satellite communication system 12, via the wired and/or wireless communication system 14, via a combination thereof, or the like. Accordingly, databases 44 may be used to store files of so-called video on-demand (VOD) or near video on-demand (NVOD), wherein, when requested by users of the devices 16-20, content server 22 may provide the demanded program content thereto.

Of course, the filing system used by database(s) 44 merely illustrates one way of providing pre-recorded content using server 22. In other examples, content server 22 could control delivery of live program contents to user devices 16-20 as well. For example, content server 22 may utilize other servers or third-party affiliates to deliver live program content(s) to user devices 16-20. It should be appreciated that such other servers or affiliates may or may not be associated with or owned by the same entity which owns and/or operates server 22 (or gateway 30). Additional aspects of live TV communication via server 22 will be appreciated by skilled artisans.

In at least one example, each of the encoder(s) 46 may be identical; therefore, only one will be described. As used herein, an encoder is an electronic device that, upon executing software instructions, compresses audio data, video data, meta-data, or a combination thereof—allowing more audio data, video data, meta-data, or a combination thereof to be transmitted but using less bandwidth (e.g., compared to transmission without compression). In at least some examples, the encoder 46 comprises at least a portion of processor 40. Encoder 46 may comprise one or more compression algorithms, embodied as software instructions, and such compression algorithms (and techniques for the use thereof) are generally known in the art.

In some examples, the encoder 46 also may receive as input a maximum bitrate value (e.g., from processor 40 or from one of the user devices 16-20), and based on this maximum bitrate value, encoder 46 may determine a codec profile which will support the requested maximum bitrate value. Thus, using one or more encoders 46, content server 22 may transmit, for a given program content, multiple bitrate values (e.g., three to six different bitrate values). While not shown in the figures, content server 22 may utilize a statistical multiplexer or the like to deliver efficiently multiple program contents to multiple user devices 16-20, each at a respective, predetermined bitrate value.

Turning now to wired and/or wireless communication system 14 shown in FIG. 1, system 14 may comprise a land communication network 50 and a wireless communication network 52. Network 50 may include any wired network enabling connectivity to public switched telephone network (PSTN) such as that used to provide hardwired telephony, packet-switched data communications, internet infrastructure, and the like. Network 50 may be coupled to content server 22 (as described above), to other computers or servers (not shown), to wireless communication network 52, and/or to a plurality of wired and/or wireless modems 54 (here, only one is shown for purposes of illustrating an example; such modems 54 may be, e.g., residentially-used and/or commercially-used modems and/or routers, or the like).

As used herein, modem 54 is a modulator-demodulator device; i.e., it is an electronics device which transmits and receives data over, for example, telephone or cable lines. In some examples, it may comprise a computing device that executes software instructions to transmit and/or receive data, and as modems are generally known in the art, modem 54 will not be described further here.

Turning now to wireless communication network 52, network 52 may include any suitable infrastructure facilitating cellular communication, including but not limited to, infrastructure configured for LTE, GSM, CDMA, etc. communication. For example, network 52 may comprise a plurality of e-NodeBs, serving and gateway nodes, location registers, etc. (each of which are not shown)—e.g., according to known wireless network infrastructure and telecommunication techniques. Other aspects of land and/or wireless communication networks 50, 52 also will be appreciated by skilled artisans.

User devices 16-20 (FIGS. 1-2) each may be configured to receive program content from content server 22. According to the illustrated example, user device 16 is a set top box (STB) which can be connected to: a television 58, the modem 54 (e.g., the Internet via wired communication network 50), the satellite communication system 12 via a satellite transceiver 60, and optionally, the wireless communication network 62 (e.g., via a wireless chipset 62, described below). User device 18 is illustrated as a Smart phone—which comprises a dedicated user interface—and which can be connected to: the modem 54 (e.g., the Internet via wired communication network 50) and/or wireless communication network 52. And user device 20 is illustrated as a laptop computer having two-way communication capabilities—which comprises a dedicated user interface—and which similarly can be connected to: the modem 54 (e.g., the Internet via wired communication network 50) and/or wireless communication network 52. These are merely examples of user devices; other examples exist (e.g., including but not limited to a personal digital assistant (PDA), a netbook computer, a tablet computer, or the like). Further, while each device 16-20 comprises a different look and feel (e.g., an STB, a Smart phone, and a laptop), in at least one example, two or more of the user devices may be similar or identical.

According to one example, each of user devices 16-20 may comprise the following hardware: at least one processor 70, memory 72, wireless chipset 62, and a decoder 74. According to one example, processor(s) 70 may comprise one or more devices capable of processing electronic instructions—non-limiting examples of processor(s) 70 include: a microprocessor, a microcontroller or controller, an application specific integrated circuit (ASIC), a field-programmable logic array (FPGA), etc.—just to name a few. As will be apparent from the description which follows, processor 70 may be programmed to carry out at least a portion of the method described herein. For example, processor(s) 70 can be configured to execute digitally-stored instructions which may be stored in memory 72 which include, among other things: receiving program contents from content server 22; monitoring and/or recording TXQ parameters while receiving program content, including monitoring codec profiles and/or bitrate values of incoming program content; determining at least one TXQ parameter based on usage; transmitting, to content server 22, a request that includes the at least one TXQ parameter; and receiving the new program content from the server 22 in accordance with the at least one TXQ parameter. As used herein, the phrase "in accordance with the at least on TXQ parameter" (or "in accordance with [any suitable type of TXQ parameter]") means that the new program content is received by the respective user device using the least one TXQ parameter. For instance, as will be explained in greater detail below, if the requested TXQ parameter is a maximum bitrate value, then, when the user device receives the new program content "in accordance with [the maximum bitrate value]," the user device receives the new program content at the requested maximum bitrate value. These instructions are merely examples which may be executed in total or according to any suitable combination or sequence; other instruction examples also exist.

Memory 72 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 72 may store one or more computer program products which may be embodied as software, firmware, or the like; however, instructions stored therein may be unique to user devices 16-20 and functions thereof.

According to one example, wireless chipset 62 may comprise: a cellular chipset facilitating cellular communication over a wide-geographic region (e.g., via LTE, CDMA, GSM, or the like); one or more short-range wireless communication (SRWC) chipsets facilitating Wi-Fi, Wi-Fi Direct, Bluetooth, Bluetooth Low Energy (BLE), etc. communication; one or more satellite chipsets facilitating communication between the device and satellite communication system 12; or a combination thereof. And as discussed above, chipset 62 may be optional in some examples.

As used herein, decoder 74 is an electronic device that, upon executing software instructions, decompresses the audio data, video data, meta-data, or a combination thereof compressed and transmitted by content server 22. In at least some examples, the decoder 74 comprises at least a portion of processor 70. Decoder 74 may comprise one or more decompression algorithms, embodied as software instructions, and such decompression algorithms (and techniques for the use thereof) are generally known in the art.

Figure 2:
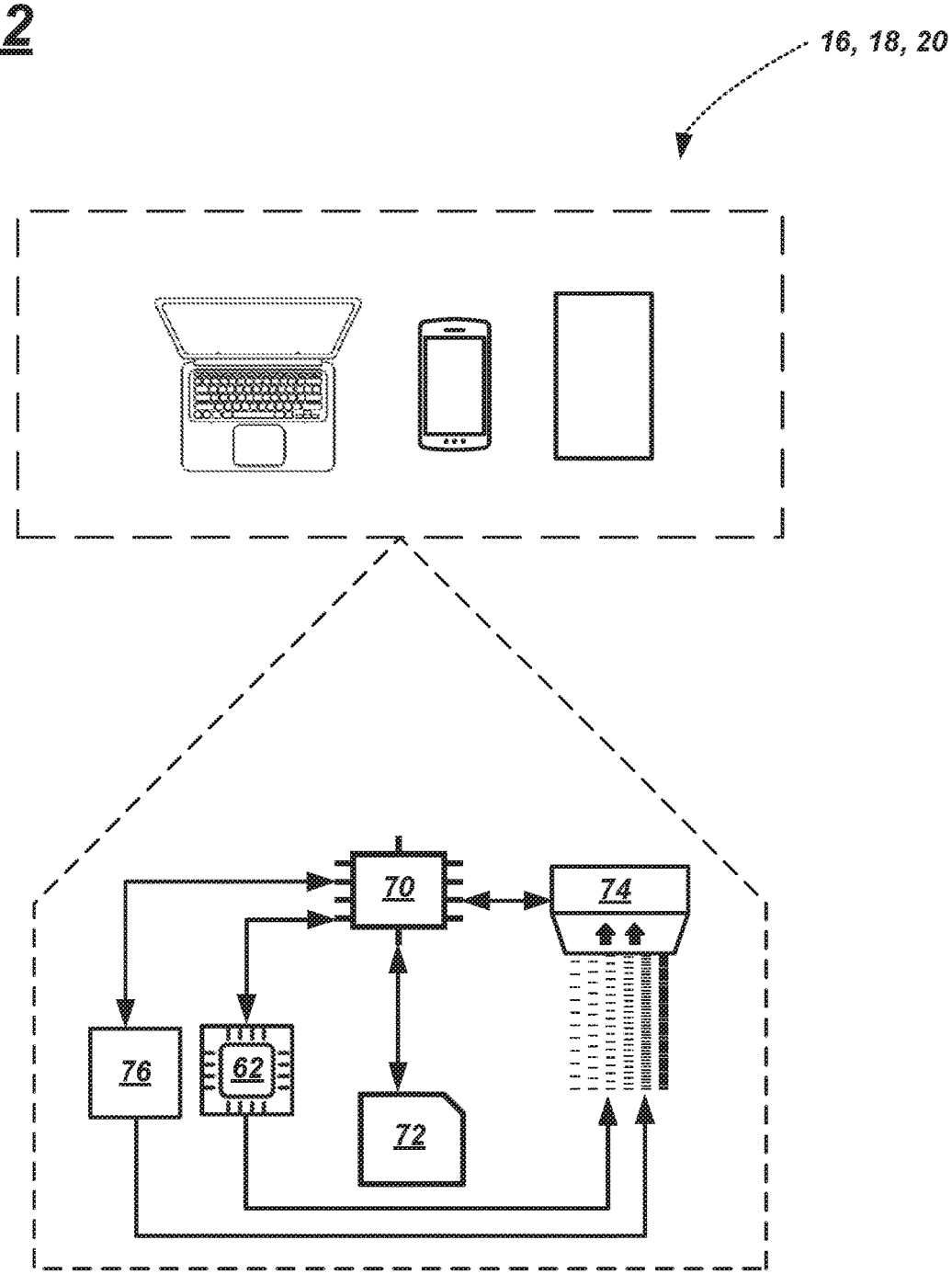
FIG. 2 is a schematic diagram illustrating non-limiting examples of user devices which can control a manner in which program content is transmitted, to them, by a content server.

FIG. 2 further illustrates that, in at least one example, user devices 16-20 may comprise an optional wired interface 76 as well. Interface 76 may be any suitable electrical or electro-mechanical connection that permits program content to be received, by wire, at the respective user device. Non-limiting examples of interface 76 include an Ethernet port, a USB port, a coaxial cable port, or the like. In at least one example, processor 70 may sense and/or control an electrical connection at interface 76.

Figure 3:
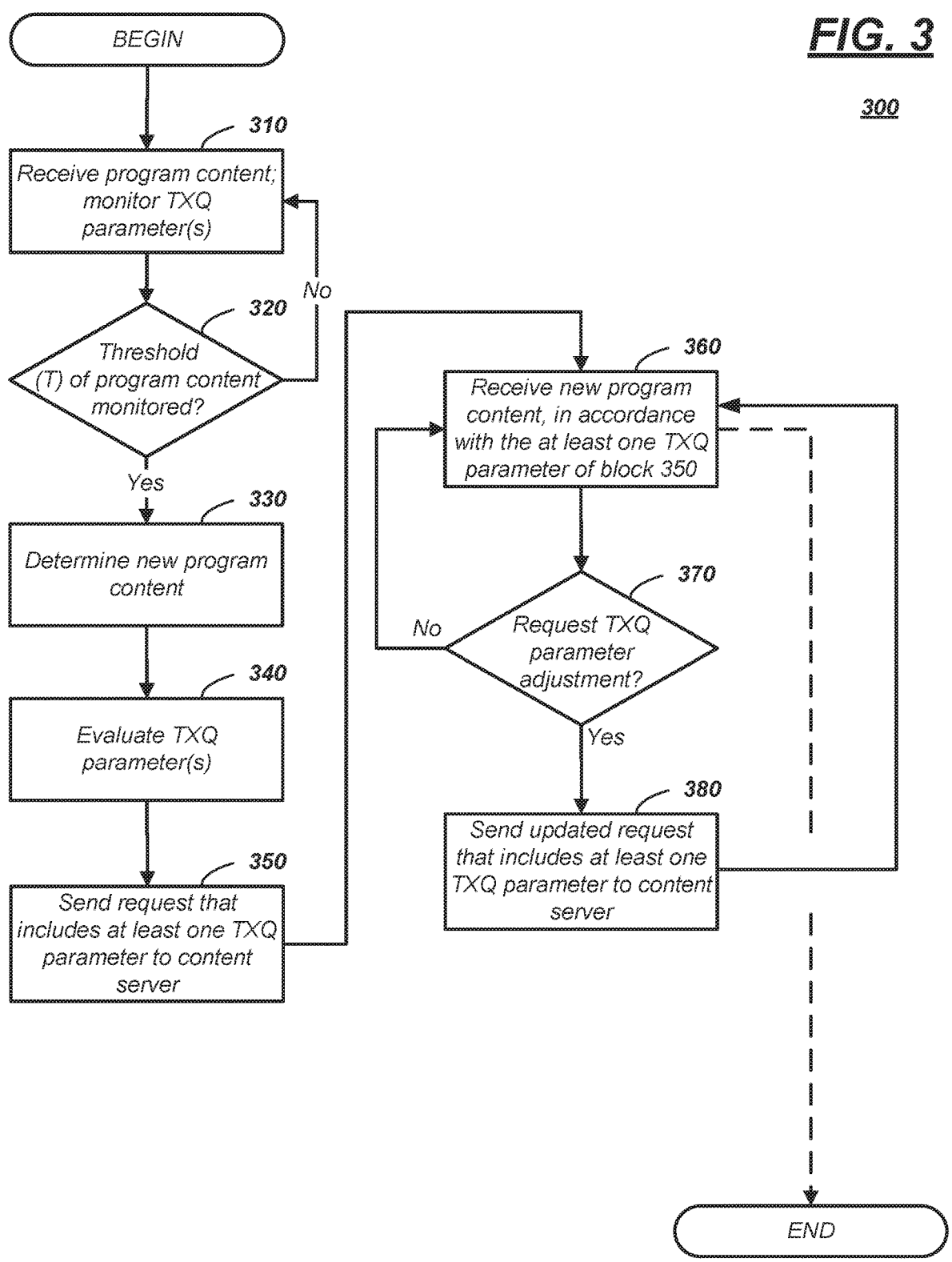
FIG. 3 is a flow diagram illustrating a process that enables a user device to control a transmission parameter relevant to delivery of program content.

Turning now to FIG. 3, a process 300 is illustrated that enables the user devices 16-20 to control at least one TXQ parameter—i.e., with respect to delivery of content program(s) from content server 22. More particularly, using process 300, user devices 16-20 may: determine one or more TXQ parameters based on monitoring program content delivered using content server-controlled TXQ parameters; transmit, to the content server 22, one or more TXQ parameters; and in response, receive, from the content server 22, program content in accordance with the requested TXQ parameter(s). Using process 300, media delivery system 10 may distribute computational burden over a number of computing devices (e.g., potentially millions of user devices, as well as one or more content servers). As process 300 may be executed similarly by each of devices 16, 18, 20, process 300 is described with respect to only one user device (16).

Process 300 begins with block 310. In block 310, user device 16 receives program content from server 22, and processor 70 and/or decoder 74 decompresses it. User device 16 may receive program content via satellite communication system 12, via wired and/or wireless communication system 14, a combination thereof, or the like. While user device 16 continues to receive program content, user device 16 monitors at least one of the transmission-quality-of-service (TXQ) parameters. According to one example, user device 16 monitors a level parameter (e.g., a maximum bitrate value) of the received program content. Alternatively, or in addition thereto, user device 16 may monitor other level parameters (e.g., a frame rate value, a frame size value, etc.) and/or a codec profile of the respective program content. While this monitoring continues, audio data, video data, meta-data, or a combination thereof may be presented to a user 80 (FIG. 1) of the device 16 (e.g., via television 58 or other display device). Further, user 80 may be unaware of such monitoring (e.g., there may be no indication on a display or the like).

In at least one example, the encoder 46 of content server 22 may process audio data, video data, meta-data, or a combination thereof into segments, and user device 16 (e.g., decoder 74) may identify these segments upon receipt. As used herein, a segment of program content is a measurable duration of receipt of audio data, video data, meta-data, or a combination thereof. In at least one example, for each type of program content, the segments have an equal and predetermined duration; however, this is not required. According to one example, fast-action video may have a first segment duration; slow-action video may have a second, different segment duration; etc. Further, each time program content provided to the user changes (e.g., due to an increment in the programming schedule, on-demand programming requests, changes of viewed channel, etc.), the user device 16 may receive audio data, video data, meta-data, or a combination thereof according to a different segmentation (e.g., a different segment duration may be used and/or segments may start over). Non-limiting examples of segment duration include: a range of 0.5 seconds to 60 seconds; a range of 60 seconds to one hour; and a program content duration (e.g., 30 minutes to 3 hours), just to name a few.

In block 320 which follows, processor 70 of user device 16 may determine whether a threshold (T) of program content has been monitored. For example, at this time, processor 70 may have monitored only one or a few segments of program content (e.g., a news program, television sitcom(s) or movie(s)). Accordingly, the threshold T may not be met, and process 300 may loop back and repeat blocks 310, 320—e.g., monitoring additional program content received from content server 22. This looping back to block 310 may recur as many suitable times as required—e.g., until the threshold (T) is met.

In one example, the threshold (T) may be a duration of program content (—e.g., a predetermined quantity of segments of program content (e.g., two segments, one segment, a fraction of a segment, or the like)). In other examples, the threshold (T) may include monitoring at least two different values of a TXQ parameter until at least one TXQ parameter is a predetermined amount larger than another. Other examples also exist.

Figure 4:
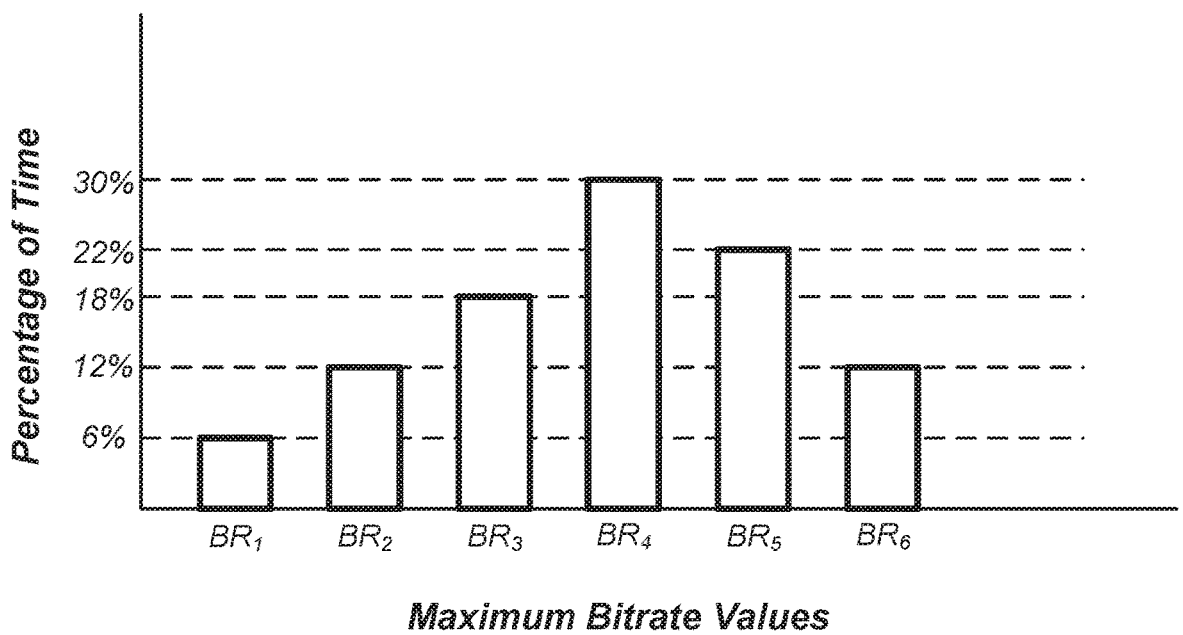
FIG. 4 is a chart that shows an illustrative set of transmission-quality-of-services (TXQ) parameters.

FIG. 4 illustrates one non-limiting example of a set of TXQ parameters—e.g., which may be monitored by processor 70 and stored in memory 72 (e.g., here, a plurality of maximum bitrate values is shown (horizontal axis)). Consider the following non-limiting examples of maximum bitrate values: 400 kilo-bits-per-second (kbps) ($BR_1$), 700 kbps ($BR_2$), 1500 kbps ($BR_3$), 2500 kbps ($BR_4$), 4000 kbps ($BR_5$), and 6000 kbps ($BR_6$). In the illustration, the vertical axis is a percentage of time receiving each respective maximum bitrate value; however, a percentage is merely one evaluation technique. Others exist—e.g., including evaluating raw time values, normalized time values, etc. As will be described below, processor 70 may determine what maximum bitrate value was used most often to receive program content (during block 310). In accordance with the example shown in FIG. 4, processor 70 may determine that maximum bitrate value $BR_4$ is the largest quantity.

Other TXQ parameters could be monitored similarly; e.g., a set of codec profiles, a set of frame rate values, etc. Thus, a set of bitrate values is merely one example. According to one example, once the threshold (T) is met, process 300 may proceed to block 330.

It should be appreciated that during blocks 310 and 320 content server 22 may be in control of and may determine default TXQ parameters. For example, content server 22 may provide a first maximum bitrate value to user device 16. Providing this first maximum bitrate value may be based on content server 22 measuring a response duration after sending a ping to user device 16. Or this may be based on content server 22 measuring a response duration (e.g., after sending a message to user device 16) or the like. Furthermore, during blocks 310, 320, content server 22 may alter one or more TXQ parameters (e.g., send a second, different maximum bitrate value) based on network conditions, a request from user device 16, a change in a type of program content (e.g., slow-action video to fast-action video or vice-versa), or the like. Thus, as discussed above, blocks 310, 320 include content server 22 determining a default TXQ parameter, wherein the term default means initial and predetermined—in this case initialized and predetermined by the content server 22.

In block 330, a new program content is determined (e.g., coinciding with new segment monitoring). According to one example, user device 16 is in an ON state, and a new program content is part of regularly-scheduled television programming (e.g., thus, user device 16 simply receives it because it is in the ON state). In another example, user device 16 receives an indication of the new program content via user input. For example, user 80 may provide input into a touch-screen interface or remote control (neither is shown) which operates user device 16—e.g., indicating that user 80 wishes to view new program content. In some instances, user 80 may be changing a programming channel; in other instances, user 80 may be requesting audio or video on-demand or the like. Other indications of user device 16 providing new program content are also possible.

In response to block 330, in block 340, processor 70 of user device 16 may evaluate at least one TXQ parameter. Thus, at this time, processor 70 may evaluate the current state of a set of monitored TXQ parameters. Considering (for sake of example) the TXQ parameters shown in FIG. 4 to be the current state of the set of monitored TXQ parameters, processor 70 may identify the most-frequently used maximum bitrate value in the set—e.g., maximum bitrate value $BR_4$. According to one example, processor 70 determines a mathematical mode (e.g., $BR_4$ being the mode). As used herein, a mathematical mode is a TXQ parameter which occurs most frequently during one or more of the previous segments of program content. In at least one example, the mode is a TXQ parameter of the segment immediately previous to the current segment. This is merely one example; other evaluation techniques are possible as well. Further, as described above, processor 70 may evaluate alternative and/or additional TXQ parameters (e.g., such as a mathematical mode of the codec profiles monitored in block 310 or the like).

In block 350 which follows, user device 16 may transmit a request that includes the evaluated at least one TXQ parameter to content server 22. By sending this request, user device 16 may control the manner in which program content delivered to it—i.e., in accordance with the TXQ parameter sent in the request. For example, by sending this request, user device 16 instructs server 22 to update one of its default TXQ parameters (with respect to the user device 16). User device 16 may transmit the request via satellite communication system 12, via wired and/or wireless communication system 14, a combination thereof, or the like.

Upon receiving the request, content server 22 may be programmed to identify the request as legitimate; further, any suitable verification techniques may be used enabling the server 22 to validate the request (e.g., including, but not limited to, encryption techniques, redundant messaging, etc.).

Accordingly, content server 22 may transmit, and user device 16 may receive, the new program content, in accordance with the evaluated at least one TXQ parameter (block 360)—e.g., via satellite communication system 12, via wired and/or wireless communication system 14, a combination thereof, or the like. For example, if the request included maximum bitrate value ($BR_4$), then content server 22 may set the default maximum bitrate value for the particular user device 16 to $BR_4$. In this manner, at the outset of the new program content, user device 16 initially receives a bitrate value which more likely desirable. This is particularly true as usage of device 16 by user 80 often may be typical—e.g., as user 80 may use the device 16 in a similar manner on most days. This is particularly true in the case of a set top box, which is less likely to be moved to different geographic regions where network congestion may vary. Regardless, of the type of hardware of user device 16 (e.g., set top box, Smart phone, laptop computer, or the like), processor 70 of user device 16 may determine these patterns and may instruct content server 22 to change a default setting.

In some examples, the request sent by user device 16 (in block 350) comprises multiple TXQ parameters to be applied by content server 22. In some instances, content server 22 delivers program content in accordance therewith (block 360—device 16 receives accordingly). In other examples, the requested TXQ parameters present a conflict or are not feasible at server 22. In these instances, content server 22 may give priority to one of the requested TXQ parameters. In at least one example, level parameters receive priority over codec profiles—e.g., this enables the content server 22 to adjust codec profiles in accordance with a requested level parameter to deliver content at typical quality (i.e., deliver program content at a quality suitable to the user 80). Further, in at least one example, the maximum bitrate value (a level parameter) receives priority over codec profile(s) and other level parameters. These are merely examples of priority; other examples exist.

Block 370 follows block 360. In block 370, user device 16 may desire a faster maximum bitrate value than its previously-requested default bitrate value (sent in block 350). Or user device 16 may desire a slower bitrate value than its previously-requested default bitrate value. Either example could be driven by network conditions, environmental conditions, a user desiring to minimize data rate usage, etc. Where no bitrate adjustment (e.g., higher or lower) is requested by user device 16, process 300 loops back and repeats block 360. This looping back may occur repeatedly until either a bitrate adjustment is requested (in block 370) or the process 300 ends (e.g., as the new program content comes to an end).

When in block 370, processor 70 of user device 16 determines a TXQ parameter adjustment is requested, then process 300 proceeds to block 380. In block 380, the user device 16 transmits an updated request comprising at least one TXQ parameter (e.g., a new maximum bitrate value) to content server 22—e.g., via satellite communication system 12, via wired and/or wireless communication system 14, a combination thereof, or the like. Thereafter, the process 300 may loop back to block 360—as the content server 22 may respond accordingly, as already described above—e.g., the user device 16 may receive the new program content at an adjusted bitrate value (as requested). It should be appreciated that block 370 may be a temporary change of a bitrate value—e.g., not a change of a default setting at the content server 22 (as in block 350). That said, user device 16 may account for any program content received via the different bitrate value (e.g., continuing to monitor and/or store parameters, as described above with respect to block 310).

As described above, eventually the new program content may end, and process 300 may end. Of course, process 300 may be repeated. Monitored TXQ parameter(s) may be stored in non-volatile memory 72 so that, once the threshold (T) is met, user device 16 receives from content server 22 program content, in accordance with the last requested TXQ parameter(s)—e.g., now the default TXQ parameter(s). Further, it should be appreciated that each time additional program content is received by user device 16, blocks 310 may be carried out in the background e.g., so that, in accordance with block 340, a different mathematical mode (or the like) may be evaluated if monitored TXQ parameter(s) deviate from their historical distributions.

In some examples, user device 16 initially may transmit to content server 22 one or more historical TXQ parameters, according to a desired type of program content. For example, to initiate receiving program content from server 22, user device 16 initially may transmit a set of one or more historical TXQ parameters when the user selects slow-action video. Alternatively, the user device 16 may transmit a different set of one or more historical TXQ parameters when the user selects medium-action or fast-action video. These historical TXQ parameters may be used until the user device 16 has monitored a threshold (T) of program content and can determine one or more suitable TXQ parameter(s) for the current program content.

Further, it should be appreciated that process 300 was described with respect to a single user device (device 16). However, in application, potentially millions of similar user devices may execute similar instructions which reduce the computational burden on the content server 22. These instructions may be available to user devices 16-20 via a software application download or the like.

It should be appreciated that content server 22 may use so-called real-time encoding based on feedback from user devices using the TXQ parameters, instead of using predetermined encoding profiles determined by the content server or other backend systems. Further, in at least one example, if the user device ceases sending TXQ parameters to content server 22, the server 22 may cease encoding and transmitting audio data, video data, meta-data, or a combination thereof to the respective user device. Thus, the respective user device may control whether or not program content is transmitted by content server 22. Further, in this manner, media delivery system 10 may operate more efficiently— e.g., permitting server 22 to conserve computing resources when the respective user device is not requesting TXQ parameters.

The subject matter set forth herein enables user devices (e.g., set top boxes, Smart phones, laptop computers, etc.) to control transmission parameters which are otherwise controlled by a content server. According to at least one example, the user device can dictate to the content server a requested bitrate value, and the content server delivers program content at the requested value. Other examples and implementations are set forth above.

In general, the computing systems and/or devices described may employ any of a number of computer operating systems, including, but by no means limited to, versions and/or varieties of the Microsoft® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, or the Android operating system developed by Google, Inc. and the Open Handset Alliance. Examples of computing devices include, without limitation, a computer server, a computer workstation, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method comprising:
    receiving, via a user device, a first program content according to at least two transmission-quality-of-service (TXQ) parameters specific to the user device;
    in response to monitoring a threshold of a duration of the first program content, transmitting, to a content server, a request that includes an adjustment to the at least two TXQ parameters; and
    in response to transmitting the request, receiving, from the content server, a second program content according to the adjusted at least two TXQ parameters,
        wherein the content server assigns a priority to a first TXQ parameter over a second TXQ parameter of the at least two TXQ parameters.

2. The method of claim 1, further comprising:
    transmitting, to the content server, a request to adjust a bitrate value while receiving the second program content; and
    receiving, from the content server, the second program content at the requested bitrate value.

3. The method of claim 1, further comprising:
    monitoring the at least two TXQ parameters until the first TXQ parameter of the at least two TXQ parameters is a predetermined amount larger than the second TXQ parameter.

4. The method of claim 1, wherein the at least two TXQ parameters are a codec profile and a level parameter.

5. The method of claim 4, wherein the codec profile defines a compression algorithm used to compress audio data, video data, meta-data, or combination thereof.

6. The method of claim 4, wherein the level parameter comprises at least one of a bitrate value, a frame rate value, a frame size value, a profile value, a format type, a format level, or a segment duration value.

7. The method of claim 1, wherein the user device includes a set top box, a smart phone, a laptop computer having two-way communication capability, a personal digital assistant, a netbook computer, or a tablet computer.

8. A non-transitory computer-readable medium storing instructions that, when executed by a computing system, cause the computing system to perform operations comprising:
   receiving, via a user device, a first program content according to at least two transmission-quality-of-service (TXQ) parameters specific to the user device;
   in response to monitoring a threshold of a duration of the first program content, transmitting, to a content server, a request that includes an adjustment to the at least two TXQ parameters; and
   in response to transmitting the request, receiving, from the content server, a second program content according to the adjusted at least two TXQ parameters,
      wherein the content server assigns a priority to a first TXQ parameter over a second TXQ parameter of the at least two TXQ parameters.

9. The non-transitory computer-readable medium of claim 8, wherein the operations further comprise:
   transmitting, to the content server, a request to adjust a bitrate value while receiving the second program content; and
   receiving, from the content server, the second program content at the requested bitrate value.

10. The non-transitory computer-readable medium of claim 8, wherein the operations further comprise:
   monitoring the at least two TXQ parameters until the first TXQ parameter of the at least two TXQ parameters is a predetermined amount larger than the second TXQ parameter.

11. The non-transitory computer-readable medium of claim 8, wherein the at least two TXQ parameters are a codec profile and a level parameter.

12. The non-transitory computer-readable medium of claim 11, wherein the codec profile defines a compression algorithm used to compress audio data, video data, meta-data, or combination thereof.

13. The non-transitory computer-readable medium of claim 11, wherein the level parameter comprises at least one of a bitrate value, a frame rate value, a frame size value, a profile value, a format type, a format level, or a segment duration value.

14. The non-transitory computer-readable medium of claim 8, wherein the user device includes a set top box, a smart phone, a laptop computer having two-way communication capability, a personal digital assistant, a netbook computer, or a tablet computer.

15. A system comprising:
   one or more processors; and
   one or more memories storing instructions that, when executed by the one or more processors, cause the system to perform a process comprising:
      receiving, via a user device, a first program content according to at least two transmission-quality-of-service (TXQ) parameters specific to the user device;
      in response to monitoring a threshold of a duration of the first program content, transmitting, to a content server, a request that includes an adjustment to the at least two TXQ parameters; and
      in response to transmitting the request, receiving, from the content server, a second program content according to the adjusted at least two TXQ parameters,
         wherein the content server assigns a priority to a first TXQ parameter over a second TXQ parameter of the at least two TXQ parameters.

16. The system according to claim 15, wherein the process further comprises:
   transmitting, to the content server, a request to adjust a bitrate value while receiving the second program content; and
   receiving, from the content server, the second program content at the requested bitrate value.

17. The system according to claim 15, wherein the process further comprises:
   monitoring the at least two TXQ parameters until the first TXQ parameter of the at least two TXQ parameters is a predetermined amount larger than the second TXQ parameter.

18. The system according to claim 15, wherein the at least two TXQ parameters are a codec profile and a level parameter.

19. The system according to claim 18, wherein the codec profile defines a compression algorithm used to compress audio data, video data, meta-data, or combination thereof.

20. The system according to claim 18, wherein the level parameter comprises at least one of a bitrate value, a frame rate value, a frame size value, a profile value, a format type, a format level, or a segment duration value.

* * * * *